US012417444B2

(12) United States Patent
Cox

(10) Patent No.: US 12,417,444 B2
(45) Date of Patent: *Sep. 16, 2025

(54) SYSTEMS AND METHODS FOR NETWORK CONFIGURATIONS OF PIN PADS

(71) Applicant: Worldpay, LLC, Symmes Township, OH (US)

(72) Inventor: Bryan Cox, Chandler, AZ (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,219

(22) Filed: Oct. 26, 2023

(65) Prior Publication Data

US 2024/0054465 A1    Feb. 15, 2024

Related U.S. Application Data

(63) Continuation of application No. 17/648,707, filed on Jan. 24, 2022, now Pat. No. 11,836,694, which is a continuation of application No. 16/227,960, filed on Dec. 20, 2018, now Pat. No. 11,270,282, which is a continuation of application No. 15/381,304, filed on Dec. 16, 2016, now Pat. No. 10,229,404.

(51) Int. Cl.
*G06Q 20/20* (2012.01)
*G06Q 20/38* (2012.01)
*G07F 7/10* (2006.01)

(52) U.S. Cl.
CPC ........... *G06Q 20/20* (2013.01); *G06Q 20/206* (2013.01); *G06Q 20/3827* (2013.01); *G07F 7/1025* (2013.01)

(58) Field of Classification Search
CPC .. G06Q 20/20; G06Q 20/206; G06Q 20/3827; G07F 7/1025
See application file for complete search history.

(56) References Cited

U.S. PATENT DOCUMENTS

| 7,783,572 | B2* | 8/2010 | Fang | G07F 7/1008 705/68 |
| 7,905,400 | B2* | 3/2011 | Stoutenburg | G07F 7/1008 235/383 |
| 9,286,047 | B1 | 3/2016 | Avramov et al. | |
| 9,529,582 | B2* | 12/2016 | Thompson | G06F 8/61 |
| 9,760,939 | B2* | 9/2017 | Gleeson | G06Q 20/3821 |

(Continued)

OTHER PUBLICATIONS

Hummel, Richard. "Understanding and Preventing Threats to Point of Sale Systems." SANS Institute White Paper (Oct. 2015).

*Primary Examiner* — Nathan A Mitchell
(74) *Attorney, Agent, or Firm* — Bookoff McAndrews, PLLC

(57) ABSTRACT

A method of network configuration of personal identification number (PIN) pads includes obtaining a PIN pad configuration hash value for a current configuration of the PIN pad, comparing the obtained PIN pad configuration hash to a locally stored PIN pad configuration hash, upon determining that the obtained PIN pad configuration hash and the locally stored PIN pad configuration hash do not match, performing additional operations, which include requesting a new PIN pad configuration, receiving the new PIN pad configuration, receiving a new PIN pad configuration hash, and storing the PIN pad configuration hash.

20 Claims, 8 Drawing Sheets

(56) References Cited

U.S. PATENT DOCUMENTS

| | | | | |
|---|---|---|---|---|
| 10,372,440 | B1* | 8/2019 | Koeppel | H04L 9/083 |
| 2005/0033693 | A1* | 2/2005 | Toiminen | G07F 19/20 |
| | | | | 705/1.1 |
| 2008/0244553 | A1* | 10/2008 | Cromer | G06F 21/572 |
| | | | | 717/168 |
| 2011/0276807 | A1* | 11/2011 | Shin | G06F 8/65 |
| | | | | 713/189 |
| 2012/0173867 | A1* | 7/2012 | Hirabayashi | G06F 21/123 |
| | | | | 713/150 |
| 2012/0331526 | A1* | 12/2012 | Caudle | G06F 21/6209 |
| | | | | 726/4 |
| 2013/0105572 | A1* | 5/2013 | Smith | G06Q 20/10 |
| | | | | 235/379 |
| 2013/0198067 | A1* | 8/2013 | Fasoli | G06Q 20/3567 |
| | | | | 705/41 |
| 2014/0173578 | A1 | 6/2014 | Ku et al. | |
| 2014/0289130 | A1* | 9/2014 | Savolainen | G06Q 20/3221 |
| | | | | 705/71 |
| 2015/0271679 | A1* | 9/2015 | Park | H04W 12/128 |
| | | | | 713/187 |
| 2015/0339665 | A1* | 11/2015 | Hayhow | G06Q 20/401 |
| | | | | 705/71 |
| 2016/0306977 | A1* | 10/2016 | Zarakas | G06F 8/654 |
| 2016/0323106 | A1 | 11/2016 | Roper | |
| 2017/0154333 | A1 | 6/2017 | Gleeson et al. | |
| 2017/0161706 | A1 | 6/2017 | Patel | |
| 2017/0293906 | A1* | 10/2017 | Komarov | G06F 21/554 |
| 2018/0150630 | A1 | 5/2018 | Pike | |
| 2019/0012464 | A1* | 1/2019 | Ye | G06Q 20/20 |

* cited by examiner

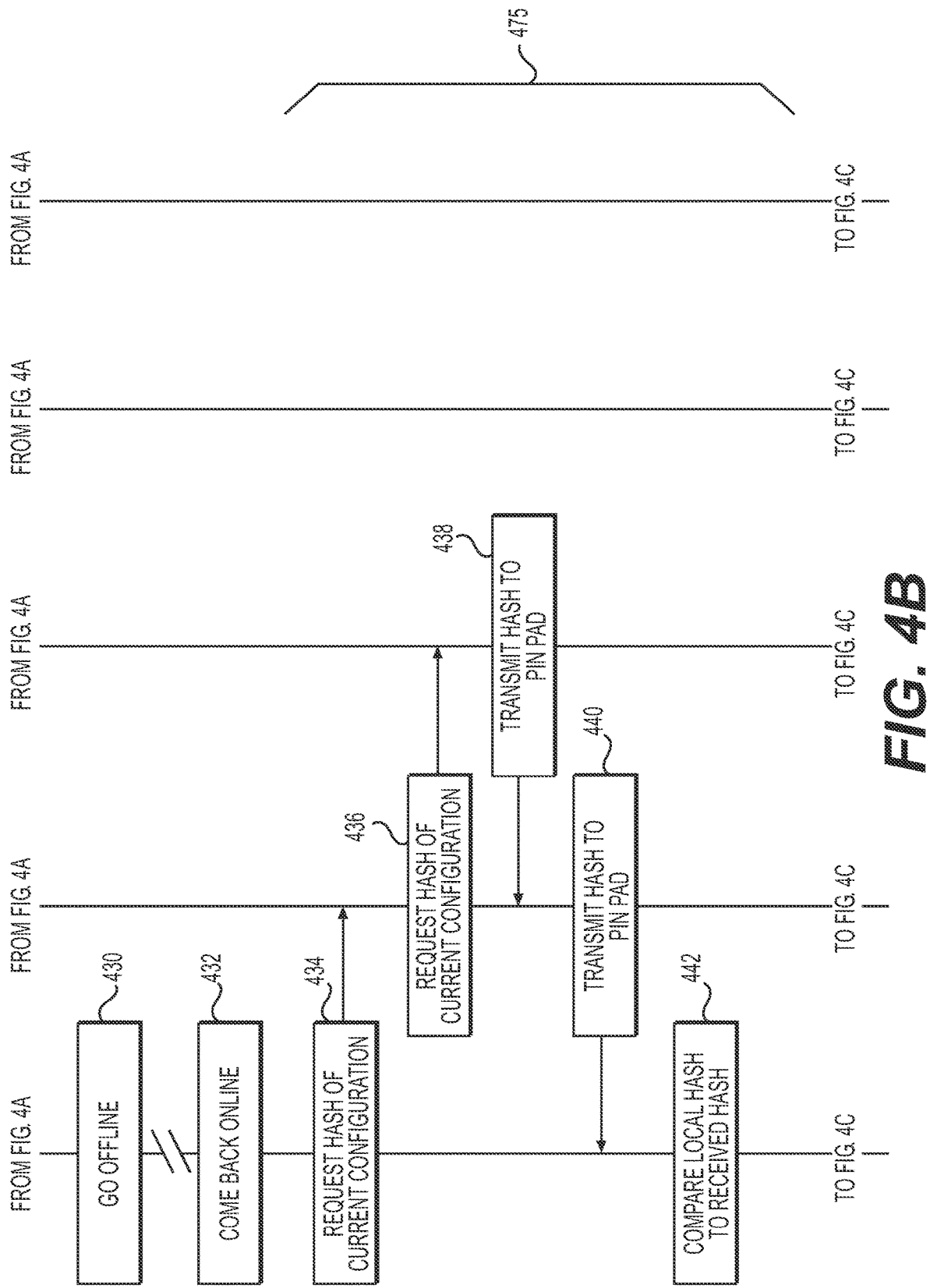

SYSTEMS AND METHODS FOR NETWORK CONFIGURATIONS OF PIN PADS

CROSS-REFERENCE TO RELATED APPLICATION(S)

This patent application is a continuation of and claims the benefit of priority to U.S. application Ser. No. 17/648,707, filed on Jan. 24, 2022, which is a continuation of and claims the benefit of priority to U.S. application Ser. No. 16/227,960, filed on Dec. 20, 2018, now U.S. Pat. No. 11,270,282, which is a continuation of and claims the benefit of priority to U.S. application Ser. No. 15/381,304, filed on Dec. 16, 2016, now U.S. Pat. No. 10,229,404, the entireties of which are incorporated herein by reference.

TECHNICAL FIELD

Various embodiments of the present disclosure relate generally to electronic payment infrastructure and, more particularly, to managing the configuration of personal identification number (PIN) pad terminals associated with a merchant point of sale (POS) environment.

BACKGROUND

Traditionally, merchants and other store owners have point of sale (POS) terminals and POS systems that can accept check or payment card payments from consumers for goods and services. Such POS systems may include PIN pads at which a consumer may enter payment and/or personal information in order to complete payment processing requests for purchases. PIN pads may be controlled according to configurations relating to user interaction, connections to merchant and/or payment processor systems and networks, security and authentication, etc. Such configurations may be updated periodically, and a PIN pad may not operate correctly if an out-of-date configuration is in use. The generation of a new configuration for a PIN pad may be complex and time consuming and/or may be performed by systems outside of the merchant's environment. Thus, regenerating and installing a new configuration for a PIN pad may prevent a PIN pad from being available to a merchant for a substantial amount of time, thus causing frustration and dissatisfaction for the merchant and consumers, and possibly leading to a loss of revenue for the merchant. For example, there may be circumstances in which a PIN pad goes out of service due to, for example, a loss of power to the PIN pad terminal, an internal malfunction of the PIN pad terminal, a manual reset performed on the PIN pad by a user or administrator, or for other reasons. Upon coming back into service, it may not be known to the PIN pad whether the configuration currently running on the PIN pad is the most recent correct configuration. Thus, the PIN pad may be required to request, receive, and install a new up-to-date configuration. This process may lead to the PIN pad remaining out of service for a substantial period of time, even if the configuration currently running on the PIN pad is the most recent correct configuration.

The present disclosure is directed to overcoming one or more of these above-referenced challenges.

SUMMARY OF THE DISCLOSURE

According to certain aspects of the disclosure, systems and methods are disclosed for network configuration of personal identification number (PIN) pads.

In one embodiment, a computer-implemented method is disclosed for network configuration of personal identification number (PIN) pads. The method includes: obtaining, over a computer network, a PIN pad configuration hash value for a current configuration of the PIN pad, comparing, using a hardware processor, the obtained PIN pad configuration hash to a locally stored PIN pad configuration hash, upon determining that the obtained PIN pad configuration hash and the locally stored PIN pad configuration hash do not match, performing additional operations, comprising: requesting a new PIN pad configuration, receiving the new PIN pad configuration, receiving a new PIN pad configuration hash, and storing the PIN pad configuration hash.

In another embodiment, a computer-implemented method is disclosed for network configuration of personal identification number (PIN) pads. The method includes: upon receiving a request for a current PIN Pad configuration hash from a PIN pad over a computer network, transmitting the current PIN pad configuration hash to the PIN pad, upon receiving a request for a new PIN pad configuration from the PIN pad, performing additional operations, including: generating, using at least one hardware processor, the new PIN pad configuration for the PIN pad, transmitting the new PIN pad configuration to the PIN pad, generating a new hash of the generated PIN pad configuration as the current PIN pad configuration hash, and transmitting the current PIN pad configuration hash to the PIN pad.

In accordance with another embodiment, a system is disclosed for automatically generating sample code for network configuration of personal identification number (PIN) pads. The system comprises: a memory; at least one processor; a PIN pad configured to: obtain a PIN pad configuration hash value for a current configuration of the PIN pad, compare, using the hardware processor, the obtained PIN pad configuration hash to a locally stored PIN pad configuration hash, upon determining that the obtained PIN pad configuration hash and the locally stored PIN pad configuration hash do not match, perform additional operations, including: request a new PIN pad configuration, receive the new PIN pad configuration, receive a new PIN pad configuration hash, and store the PIN pad configuration hash; and a configuration service configured to: upon receiving a request for a current PIN Pad configuration hash from a PIN pad over a computer network, transmit the current PIN pad configuration hash to the PIN pad, upon receiving a request for a new PIN pad configuration from the PIN pad, perform additional operations, including: generate, using the hardware processor, the new PIN pad configuration for the PIN pad, transmit the new PIN pad configuration to the PIN pad, generate a new hash of the generated PIN pad configuration as the current PIN pad configuration hash, and transmit the current PIN pad configuration hash to the PIN pad.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 4A-4C depict a sequence diagram of a method for network configuration of PIN pads, according to one or more embodiments.

DETAILED DESCRIPTION OF EMBODIMENTS

Various embodiments of the present disclosure relate generally to electronic payment infrastructure and to managing the configuration of personal identification number (PIN) pad terminals associated with a merchant point of sale (POS) environment.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
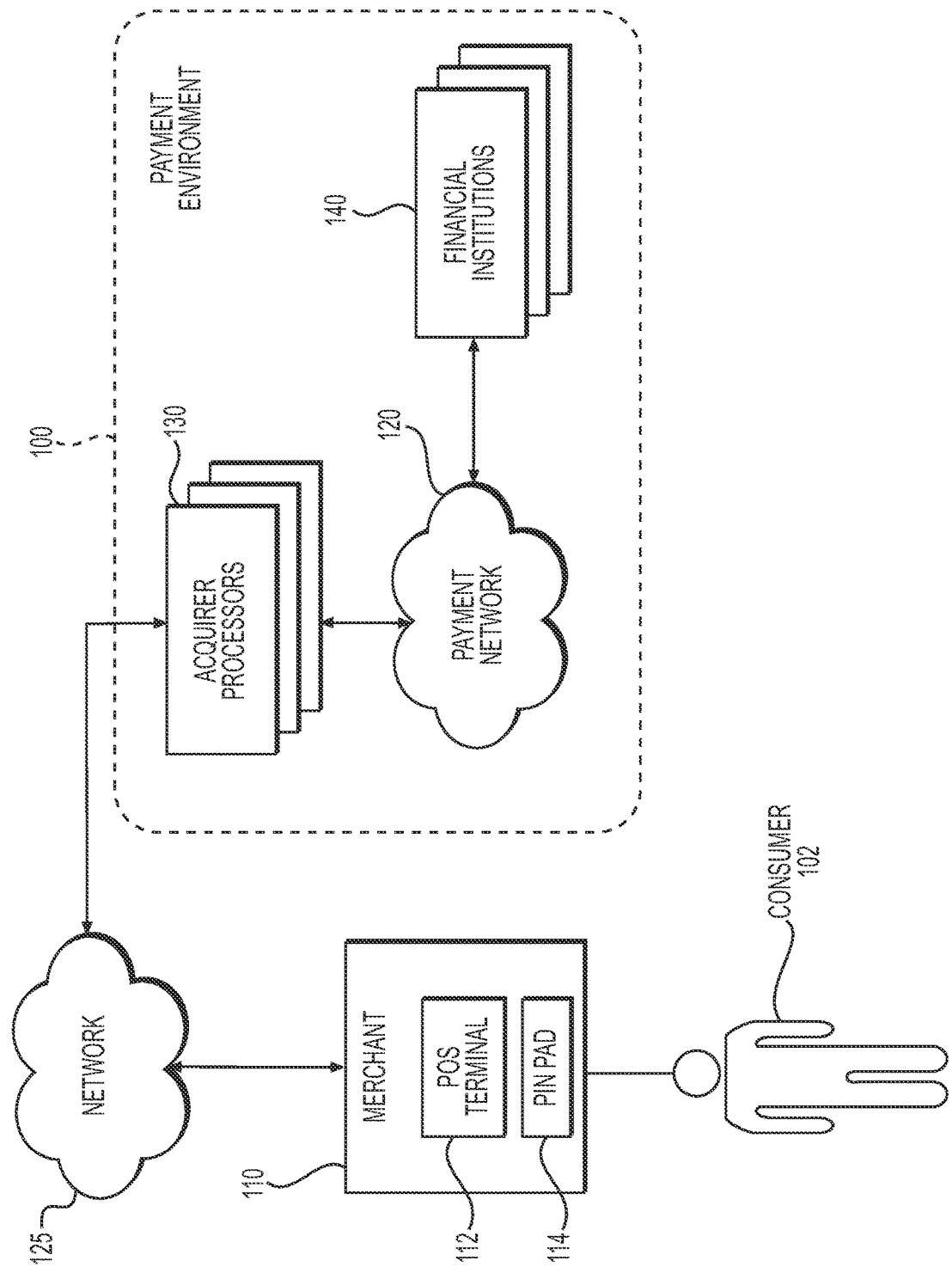
FIG. 1 depicts a block diagram of a electronic payment processing system.

Turning to FIG. 1, in an electronic payment processing system, a consumer 102, during the checkout process with a merchant 110, pays for goods or services from merchant 110 at a PIN Pad 114 associated with POS terminal 112. Consumer 102 may use a payment card as payment and the transaction is processed through a payment environment 100. Because merchant 110 generally can use a different bank or financial institution 140 than consumer 102, an acquirer processor 130 handles the financial transactions that transfer payment between the financial institution 140 of consumer 102 and that of merchant 110. Consumer 102 submits payment information at the PIN Pad 114 associated with POS terminal 112 of merchant 110, such as by swiping his or her payment card, inserting his or her chip-based payment card, through wireless near field communication (NFC), etc., or by any other suitable means. PIN Pad 114 sends a payment request by way of a computer network 125 to an acquirer processor 130. Alternatively, such a request may be sent by a component that controls a flow of a transaction, such as point of sale (POS) engine 250 depicted in FIG. 2. Acquirer processor 130 requests, by way of payment network 120, an electronic transfer of funds from the received funds to the financial institution 140 associated with merchant 110.

Figure 2:
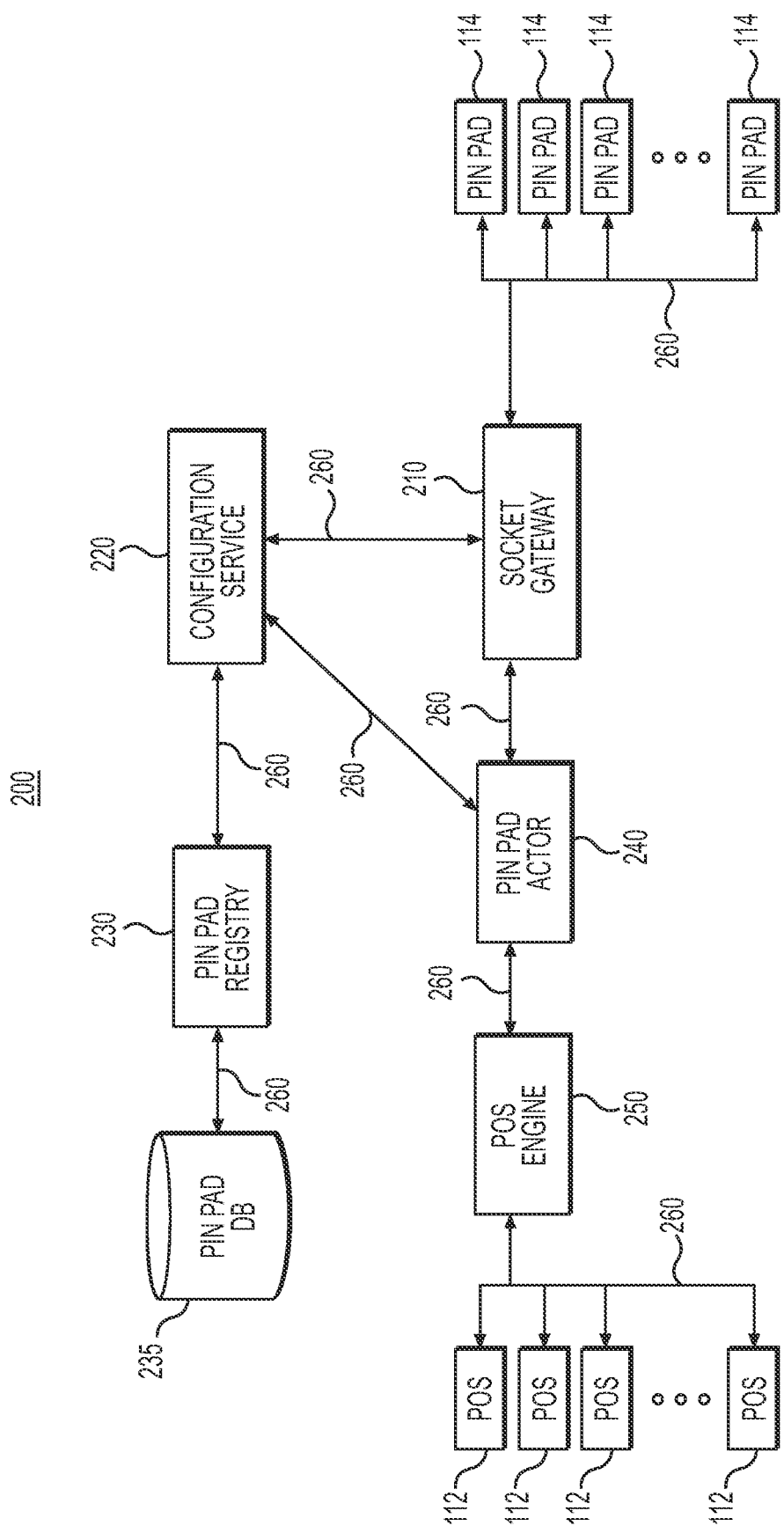
FIG. 2 depicts an exemplary system infrastructure for payment processing within a merchant environment, according to one or more embodiments.

Merchant 110 may provide an infrastructure for processing electronic payment requests. FIG. 2 depicts an exemplary system infrastructure for payment processing within a merchant environment, according to one or more embodiments.

As shown in FIG. 2, an infrastructure 200 for processing electronic payment requests may include one or more point of sale (POS) devices 112, which may be in communication with a POS engine 250, and one or more personal identification number (PIN) pad terminals 114, which may be in communication with a socket gateway 210. POS engine 250 may be embodied, for example, as middleware that may command and control the PIN pad and may send a payment request. This may be embodied as a semi-integrated solution and may further control the PIN pad on behalf of the POS device software. Such control may include controlling a transaction flow or sequence including, for example, prompting for payment card swipe or insert, sending a transaction request for authorization, prompting for a consumer signature, etc. Infrastructure 200 may further include a PIN pad actor 240, a configuration service 220, a PIN pad registry 230 and a PIN pad database 235. Socket gateway 210 may send commands to the PIN pad and may receive responses from the PIN pad. PIN pad actor 240 may provide a virtual representation of the PIN pad and may maintain a current state of the PIN pad. Configuration service 220 may, if necessary, configures the PIN pad upon connection of the PIN pad to the infrastructure. PIN pad registry 230 and PIN pad database 235 may maintain data associating each PIN pad with an account or merchant.

According to one or more embodiments, the components of infrastructure 200 may be connected by a computer network 260, such as, for example a local area network (LAN) or a wireless network, such as, for example, a WiFi network. However, other network connections among the components of infrastructure 200 may be used, such as, for example, a wide area network (WAN), the internet, or the cloud. According to one or more embodiments, the components of infrastructure 200 may operate to maintain a configuration of PIN pads 114. Methods of configuring PIN pads 114 according to one or more embodiments will be discussed with respect to FIGS. 3-5 below. Functions of the components of infrastructure 200 will be described below with respect to exemplary methods for network configuration of PIN pads.

Any suitable system infrastructure may be put into place for network configuration of PIN pads. FIGS. 1 and 2 and the discussion above provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1 and 2. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 3:
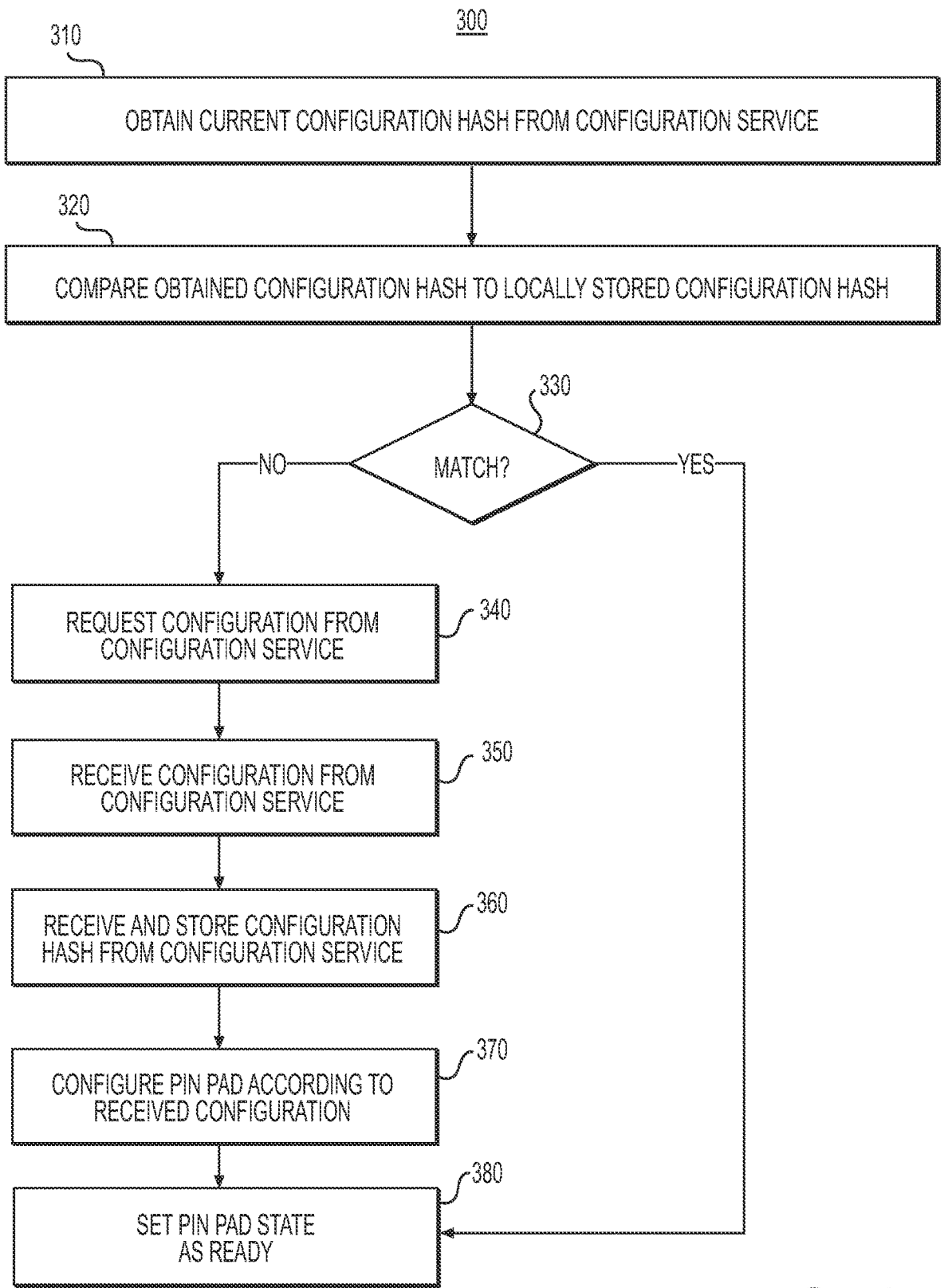
FIG. 3 depicts a flowchart of a method for network configuration of PIN pads, according to one or more embodiments.

FIG. 3 depicts a flowchart of a method for network configuration of PIN pads, according to one or more embodiments. As shown in FIG. 3, at operation 310, a PIN pad may obtain a current configuration hash for the PIN pad from a configuration service. For example, PIN pad 114, depicted in FIG. 2, may obtain a current configuration hash for PIN pad 114 from configuration service 220, depicted in FIG. 2. The current configuration hash for the PIN pad may be identified, for example, according to a model number and a serial number of the PIN pad. However, other means of identifying the current configuration hash for the PIN pad may be employed, such as, for example, a unique identifier of the current configuration hash for the PIN pad, a network address of the PIN pad, a media access control address (MAC address) of the PIN pad, etc. The current configuration hash may be created by applying any suitable hash function to a configuration file associated with the current configuration. Such a hash function may come from a category of hash functions including, for example, cyclic redundancy checks, checksums, universal hash function families, non-cryptographic hash functions, keyed cryptographic hash functions, and un-keyed cryptographic hash functions, etc. At operation 320, the PIN pad may compare the obtained configuration hash to a locally stored configuration hash. At operation 330, the PIN pad may determine whether the obtained configuration hash and the locally stored configuration hash match. If the obtained configuration hash and the locally stored configuration hash match, then the method may proceed to step 380. If the obtained configuration hash and the locally stored configuration hash do not match, then at operation 340, the PIN pad may request a new configuration from the configuration service. At operation 350, the PIN pad may receive the new configuration from the configuration service. At operation 360, the PIN pad may receive and store a configuration hash for the new configuration from the configuration service. At operation 370, the PIN pad may configure the PIN Pad according to the received new configuration. At operation 380, the PIN pad may set a state of the PIN Pad as "ready."

Figure 4A:
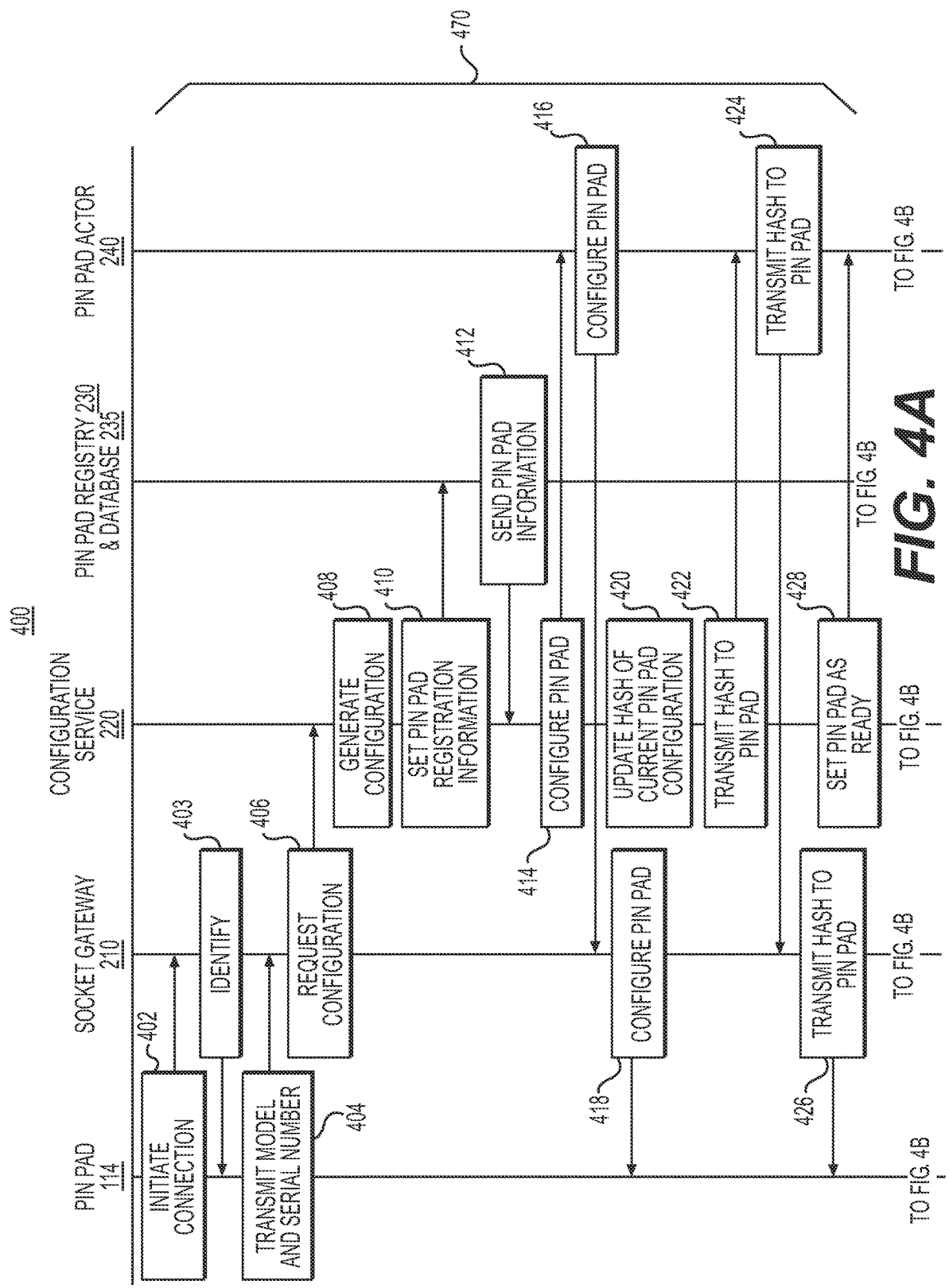
Figure 4C:
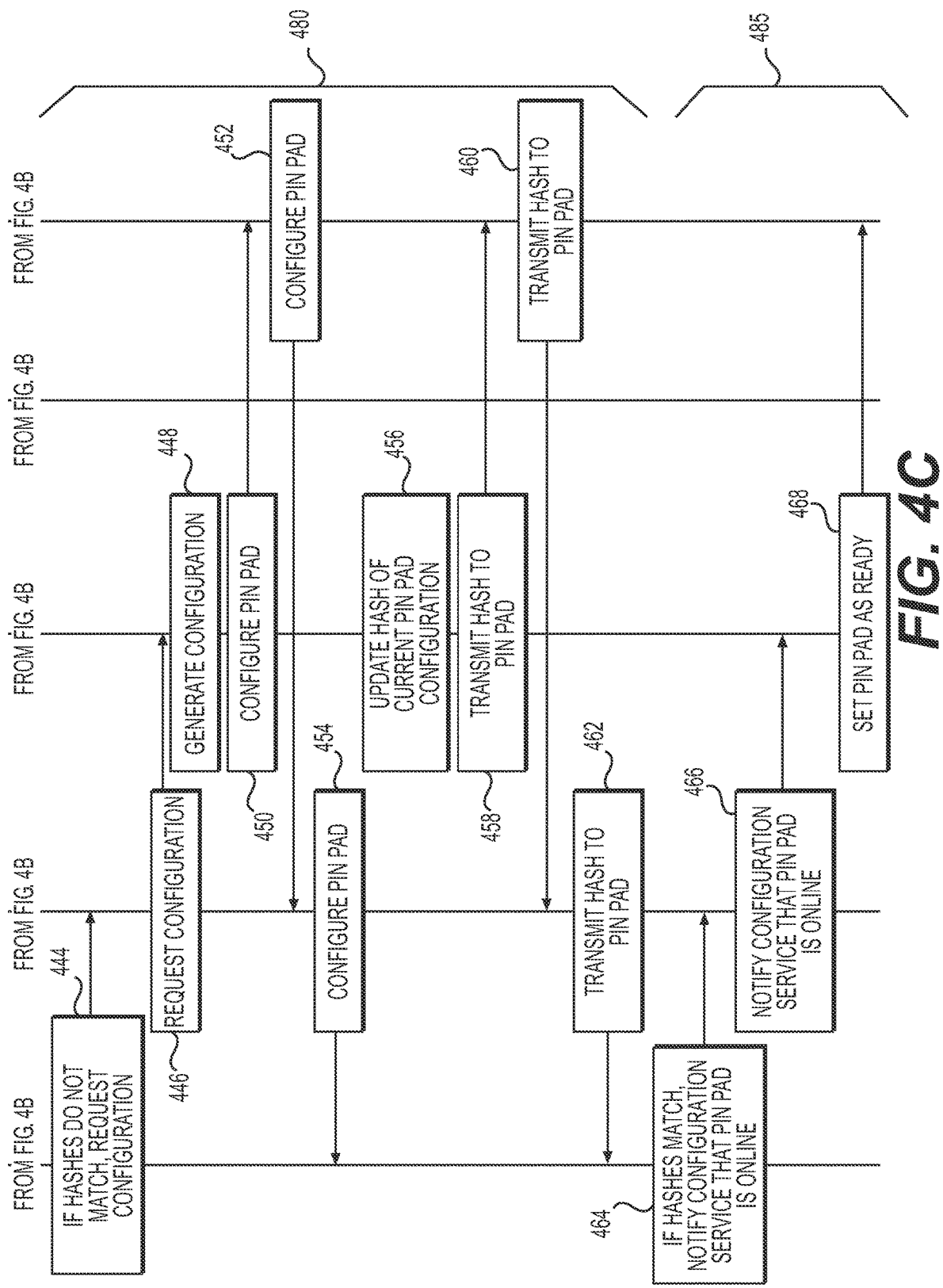

FIGS. 4A-4C depict a sequence diagram of a method for network configuration of PIN pads, according to one or more embodiments. As shown in FIGS. 4A-4C, a method for network configuration of PIN pads, according to one or more embodiments may be performed among PIN pad 114, socket gateway 210, configuration service 220, PIN pad registry 230, and PIN pad actor 240, depicted in FIG. 2. For purposes of description, such a method may be separated into separate phases, such as an initial configuration phase 470, which may include operations 402-428, a configuration checking phase 475, which may include operations 434-442, a configuration recovery phase 480, which may include operations 444-462, and a configuration confirmation phase 485, which may include operations 464-468.

In initial configuration phase 470, at operation 402, the PIN pad may initiate a connection to the socket gateway. At operation 403, the socket gateway may request that the PIN pad to identify itself. Such identification may be accomplished, for example, by retrieving a model and serial number from the PIN pad by transmitting a command to the PIN pad. Alternatively, identification may be made on the basis of a pre-registered token or key, or any other suitable mechanism to identify the unique pieces of hardware in the PIN pad. Such identification of the PIN pad may allow a determination of whether the PIN pad is registered in the PIN pad registry, and therefore, what account/merchant the PIN pad is associated with. At operation 404, the PIN pad transmit a model number and a serial number of the PIN pad to the socket gateway. The socket gateway may then, at operation 406, request a new configuration from the configuration service. At operation 408, the configuration service may generate a configuration for the PIN pad. At operation 410, the configuration service may set PIN pad registration information at the PIN pad registry, and at operation 412, the PIN pad registry may send PIN pad information back to the configuration service. At operation 414, the configuration service may generate a new current configuration for the PIN pad and transmit the configuration to the PIN pad actor. The PIN pad actor may then, at operation 416, transmit the configuration to the PIN pad by way of the socket gateway (operation 418) so that the configuration may be applied to the PIN pad. At operation 420, the configuration service may generate an updated hash of the current PIN pad configuration. At operation 422, the configuration service may transmit the updated hash to PIN pad to the PIN pad actor. The PIN pad actor may then, at operation 424, transmit the updated hash to the PIN pad by way of the socket gateway (operation 426) so that the updated hash may be stored at the PIN pad. At operation 428, the configuration service set the status of the PIN pad as "ready."

At some time after the initial configuration 470 has been completed, the PIN pad may go offline (operation 430) and, subsequently, may come back online (operation 432). After coming back online, the PIN pad may check its current configuration in the configuration checking phase 475. At operation 434, the PIN pad may request the hash of the current configuration from the configuration service by way of the socket gateway (operation 436). At operation 438, the configuration service may transmit the hash of the current configuration to the PIN pad by way of the socket gateway (operation 440). At operation 442, the PIN pad may compare a locally stored configuration hash to the received hash of the current configuration. Subsequent operations may be performed in the configuration recovery phase 480 or the configuration confirmation phase 485 depending on the result of the comparison.

If the locally stored configuration hash and the received hash of the current configuration do not match, then the PIN pad may enter the configuration recovery phase 480 at operation 444 by requesting a new configuration from the configuration service by way of the socket gateway (operation 446). At operation 448, the configuration service may generate a new current configuration for the PIN pad and, at operation 450, transmit the configuration to the PIN pad actor. The PIN pad actor may then, at operation 452, transmit the configuration to the PIN pad by way of the socket gateway (operation 454) so that the configuration may be applied to the PIN pad. At operation 456, the configuration service may generate an updated hash of the current PIN pad configuration. At operation 458, the configuration service may transmit the updated hash to PIN pad to the PIN pad actor. The PIN pad actor may then, at operation 460, transmit the updated hash to the PIN pad by way of the socket gateway (operation 462) so that the updated hash may be stored at the PIN pad. At operation 468, the configuration service set the status of the PIN pad as "ready."

If the locally stored configuration hash and the received hash of the current configuration do match, then the PIN pad may enter the configuration confirmation phase 485 at operation 464, by notifying the configuration service by way of the socket gateway (operation 466) that the PIN pad is online. At operation 468, the configuration service set the status of the PIN pad as "ready."

Figure 5:
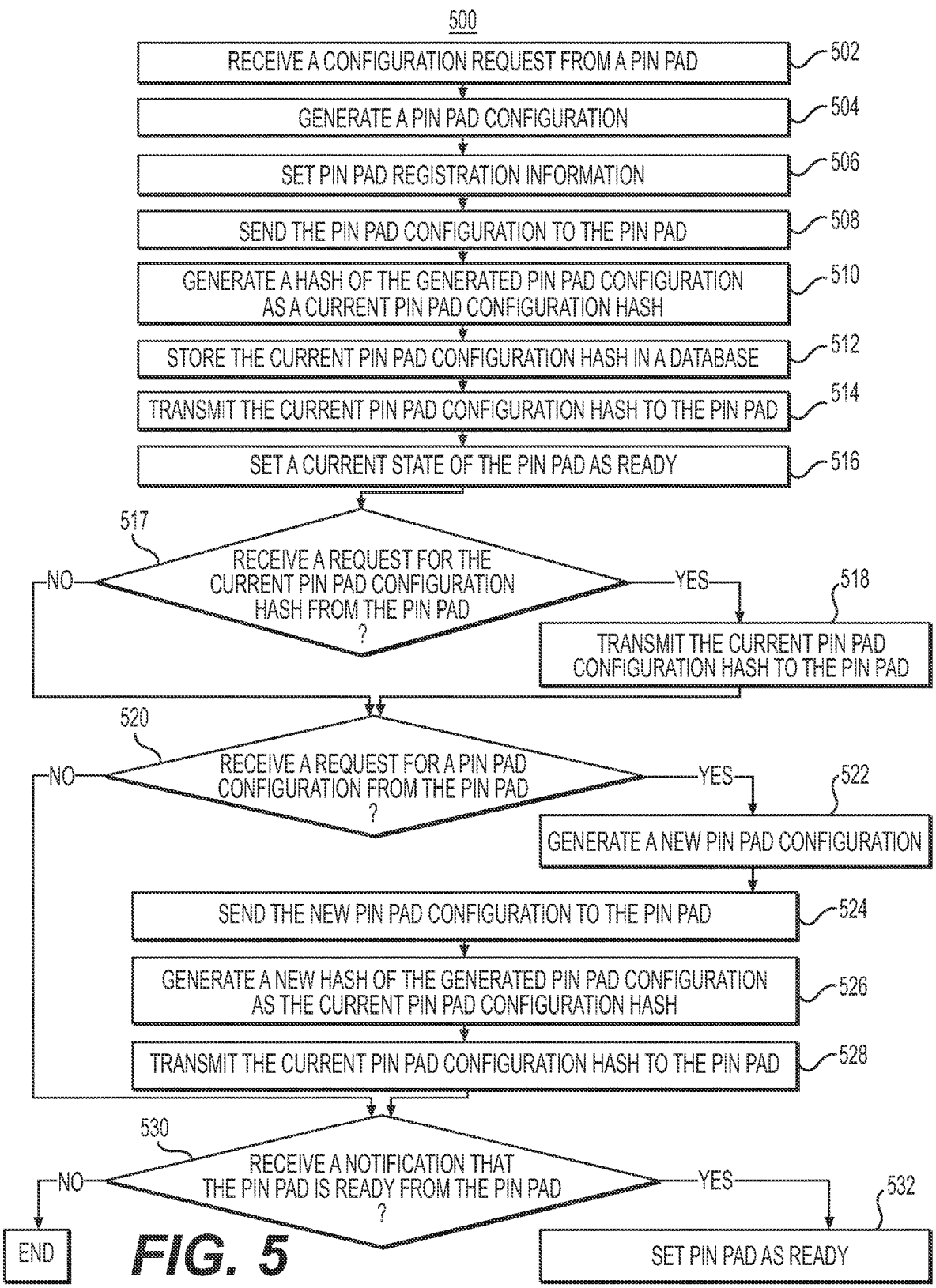
FIG. 5 depicts a flowchart of a method for network configuration of PIN pads, according to one or more embodiments.

FIG. 5 depicts a flowchart of a method for network configuration of PIN pads that may be executed by a configuration service, such as configuration service 220 depicted in FIG. 2, according to one or more embodiments. At operation 502, the configuration service may receive a configuration request from a PIN pad, such as PIN pad 114 depicted in FIG. 2. At operation 504, the configuration service may generate a new PIN pad configuration for the PIN pad. At operation 506, the configuration service may set PIN pad registration information for the PIN pad, possibly by way of a PIN pad registry, such as PIN pad registry 230 depicted in FIG. 2. At operation 508, the configuration service may send the new PIN pad configuration to the PIN pad, possibly by way of a PIN pad actor, such as PIN pad actor 240 depicted in FIG. 2, and/or a socket gateway, such as socket gateway 210 depicted in FIG. 2. At operation 510, the configuration service may generate a hash of the new generated PIN pad configuration as a current PIN pad configuration hash. At operation 512, the configuration service may store the current PIN pad configuration hash in a database (not shown). The database may include, for each PIN pad configuration, configuration data, a hash of the configuration, and identification information for PIN pads associated with the configuration. The database may further include, for each PIN pad, a hash of the current configuration for the PIN pad. At operation 514, the configuration service may transmit the current PIN pad configuration hash to the PIN pad, possibly by way of the PIN pad actor and/or the socket gateway. Alternatively, the current PIN pad configuration hash may be stored in a memory, database or other storage provided by infrastructure 200 (not shown). At operation 516, the configuration service may set a current state of the PIN pad as "ready."

At operation 517, the configuration service may receive a request for the current PIN pad configuration hash from the PIN pad. If a request for the current PIN pad configuration hash is not received from the PIN pad, then the method may continue with step 520. If a request for the current PIN pad configuration hash is received from the PIN pad, then at operation 518, the configuration service may transmit the current PIN pad configuration hash to the PIN pad.

At operation 520, the configuration service may receive a request for a new PIN pad configuration from the PIN pad. Alternatively, a request for a new PIN pad configuration may be inferred by the configuration service based on a new connection initiated by the PIN pad and a determination that the PIN pad configuration hash stored for the PIN pad does not match the current PIN pad configuration hash for the PIN pad. If a request for a new PIN pad configuration is not received from the PIN pad, then the method may continue with step 530. If a request for a new PIN pad configuration is received from the PIN pad, then at operation 522, the configuration service may generate a new PIN pad configuration. At operation 524, the configuration service may send the new PIN pad configuration to the PIN pad, possibly by way of the PIN pad actor and/or the socket gateway. At operation 526, the configuration service may generate a new hash of the new PIN pad configuration as the current PIN pad configuration hash. At operation 528, the configuration service may send the current PIN pad configuration hash to the PIN pad, possibly by way of the PIN pad actor and/or the socket gateway. Alternatively, the current PIN pad configuration hash may be stored in a memory, database or other storage provided by infrastructure 200 (not shown).

At operation 530, the configuration service may receive a notification that the PIN pad is ready from the PIN pad. Alternatively, the configuration service may infer that the PIN pad is ready based on a new connection initiated by the PIN pad. In addition, the Configuration Service may send the PIN pad a series of configuration commands. The PIN pad may respond to each command with an acknowledgement. The configuration service may infer that the PIN pad is ready when the last configuration command is acknowledged by the PIN pad. If a notification that the PIN pad is ready is not received from the PIN pad, then the method may end. If a notification that the PIN pad is ready is received from the PIN pad, then at operation 532, the configuration service may set a current status of the PIN pad as "ready."

Figure 6:
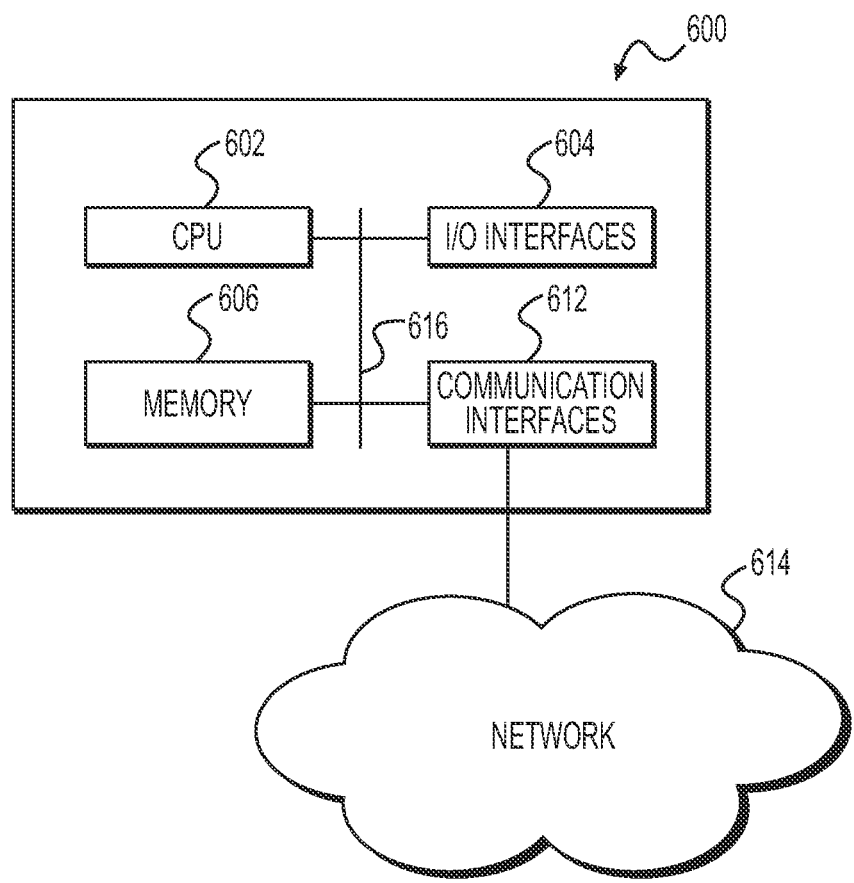
FIG. 6 is a block diagram of an example computing environment, according to one or more embodiments.

The systems and processes described above may be performed on or between one or more computing devices. FIG. 6 illustrates an example computing device. A computing device 600 may be a server, a computing device that is integrated with other systems or subsystems, a mobile computing device such as a smart phone, a cloud-based computing ability, and so forth. The computing device 600 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 600 includes a processor 602 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 600 also includes one or more memories 606, for example read-only memory (ROM), random access memory (RAM), cache memory associated with the processor 602, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 600 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 602, or memories 606 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 608 may be configured to transmit to, or receive data from, other computing devices 600 across a network 612. The network and communication interfaces 608 may be an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 608 may include wire data transmission links such as Ethernet and TCP/IP. The communication interfaces 608 may include wireless protocols for interfacing with private or public networks 612. For example, the network and communication interfaces 608 and protocols may include interfaces for communicating with private wireless networks such as Wi-Fi network, one of the IEEE 802.11x family of networks, or another suitable wireless network. The network and communication interfaces 608 may include interfaces and protocols for communicating with public wireless networks 608, using for example wireless protocols used by cellular network providers, including Code Division Multiple Access (CDMA) and Global System for Mobile Communications (GSM). A computing device 600 may use network and communication interfaces 608 to communicate with hardware modules such as a database or data store, or one or more servers or other networked computing resources. Data may be encrypted or protected from unauthorized access.

In various configurations, the computing device 600 may include a system bus 610 for interconnecting the various components of the computing device 600, or the computing device 600 may be integrated into one or more chips such as programmable logic device or application specific integrated circuit (ASIC). The system bus 610 may include a memory controller, a local bus, or a peripheral bus for supporting input and output devices 604, and communication interfaces 608. Example input and output devices 604 include keyboards, keypads, gesture or graphical input devices, motion input devices, touchscreen interfaces, one or more displays, audio units, voice recognition units, vibratory devices, computer mice, and any other suitable user interface.

The processor 602 and memory 606 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of network configuration of a personal identification number (PIN) pad, the method comprising:
    obtaining a current PIN pad configuration hash from a configuration service;
    comparing the current PIN pad configuration hash to a locally stored PIN pad configuration hash;
    determining that the current PIN pad configuration hash and the locally stored PIN pad configuration hash do not match;
    receiving a new PIN pad configuration and a new PIN pad configuration hash, wherein the new PIN pad configuration hash replaces the current PIN pad configuration hash;
    in response to receiving the new PIN pad configuration and the new PIN pad configuration hash, receiving one or more configuration commands; and
    transmitting one or more corresponding acknowledgments in response to receiving the one or more configuration commands.

2. The method of claim 1, further comprising:
    setting a state of the PIN pad as ready.

3. The method of claim 1, further comprising:
    based on determining that the current PIN pad configuration hash and the locally stored PIN pad configuration hash match, setting a state of the PIN pad as ready.

4. The method of claim 1, further comprising:
    configuring the PIN pad according to the new PIN pad configuration.

5. The method of claim 1, wherein the new PIN pad configuration is received from a configuration service.

6. The method of claim 1, wherein the current PIN pad configuration hash of the PIN pad is obtained from a configuration service.

7. The method of claim 1, further comprising:
storing a PIN pad configuration hash for the new PIN pad configuration.

8. A device for network configuration of a personal identification number (PIN) pad, the device comprising:
a memory configured to store instructions; and
one or more processors configured to execute the instructions to perform operations comprising:
obtaining a current PIN pad configuration hash from a configuration service;
comparing the current PIN pad configuration hash to a locally stored PIN pad configuration hash;
determining that the current PIN pad configuration hash and the locally stored PIN pad configuration hash do not match;
receiving a new PIN pad configuration and a new PIN pad configuration hash, wherein the new PIN pad configuration hash replaces the current PIN pad configuration hash;
in response to receiving the new PIN pad configuration and the new PIN pad configuration hash, receiving one or more configuration commands; and
transmitting one or more corresponding acknowledgments in response to receiving the one or more configuration commands.

9. The device of claim 8, wherein the operations further comprise:
setting a state of the PIN pad as ready.

10. The device of claim 8, wherein the operations further comprise:
based on determining that the current PIN pad configuration hash and the locally stored PIN pad configuration hash match, setting a state of the PIN pad as ready.

11. The device of claim 8, wherein the operations further comprise:
configuring the PIN pad according to the new PIN pad configuration.

12. The device of claim 8, wherein the new PIN pad configuration is received from a configuration service.

13. The device of claim 8, wherein the current PIN pad configuration hash of the PIN pad is obtained from a configuration service.

14. The device of claim 8, wherein the operations further comprise:
storing a PIN pad configuration hash for the new PIN pad configuration.

15. A non-transitory computer-readable medium storing instructions that, when executed by one or more processors of a device for network configuration of a personal identification number (PIN) pad, cause the one or more processors to perform operations comprising:
obtaining a current PIN pad configuration hash from a configuration service;
comparing a current PIN pad configuration hash to a locally stored PIN pad configuration hash;
determining that the current PIN pad configuration hash and the locally stored PIN pad configuration hash do not match;
receiving a new PIN pad configuration and a new PIN pad configuration hash, wherein the new PIN pad configuration hash replaces the current PIN pad configuration hash;
in response to receiving the new PIN pad configuration and the new PIN pad configuration hash, receiving one or more configuration commands; and
transmitting one or more corresponding acknowledgments in response to receiving the one or more configuration commands.

16. The non-transitory computer-readable medium of claim 15, wherein the operations further comprise:
setting a state of the PIN pad as ready.

17. The non-transitory computer-readable medium of claim 15, wherein the operations further comprise:
based on determining that the current PIN pad configuration hash and the locally stored PIN pad configuration hash match, setting a state of the PIN pad as ready.

18. The non-transitory computer-readable medium of claim 15, wherein the operations further comprise:
configuring the PIN pad according to the new PIN pad configuration.

19. The non-transitory computer-readable medium of claim 15, wherein the new PIN pad configuration is received from a configuration service.

20. The non-transitory computer-readable medium of claim 15, wherein the current PIN pad configuration hash of the PIN pad is obtained from a configuration service.

* * * * *